No. 757,617. PATENTED APR. 19, 1904.
W. S. HORRY.
PROCESS OF PRODUCING CARBID.
APPLICATION FILED MAR. 29, 1902.
NO MODEL.

Witnesses:
Claude Parker
Clinton P. Townsend

Inventor:
William Smith Horry
By Eugene A. Byrnes
His Attorney.

No. 757,617. Patented April 19, 1904.

UNITED STATES PATENT OFFICE.

WILLIAM SMITH HORRY, OF NIAGARA FALLS, NEW YORK, ASSIGNOR TO UNION CARBIDE COMPANY, OF NIAGARA FALLS, NEW YORK, A CORPORATION OF VIRGINIA.

PROCESS OF PRODUCING CARBID.

SPECIFICATION forming part of Letters Patent No. 757,617, dated April 19, 1904.

Application filed March 29, 1902. Serial No. 100,647. (No specimens.)

*To all whom it may concern:*

Be it known that I, WILLIAM SMITH HORRY, a subject of the King of Great Britain, residing at Niagara Falls, in the county of Niagara and State of New York, have invented a certain new and useful Process of Producing Carbid, of which the following is a specification.

This invention, generally stated, consists of a process of producing carbids, and especially calcium carbid, by passing different quantities of electric current through different portions of a body of carbid-forming materials acting as a resistance-conductor and increasing the current density along the path of the current to a point where the heat generated by the resistance of the body causes the materials to react to form carbid.

The process is preferably carried out in a continuous manner by tapping off the molten product and supplying fresh material as required.

A suitable but not the only type of furnace for carrying out the process is shown in the accompanying drawings, in which—

Figure 1:
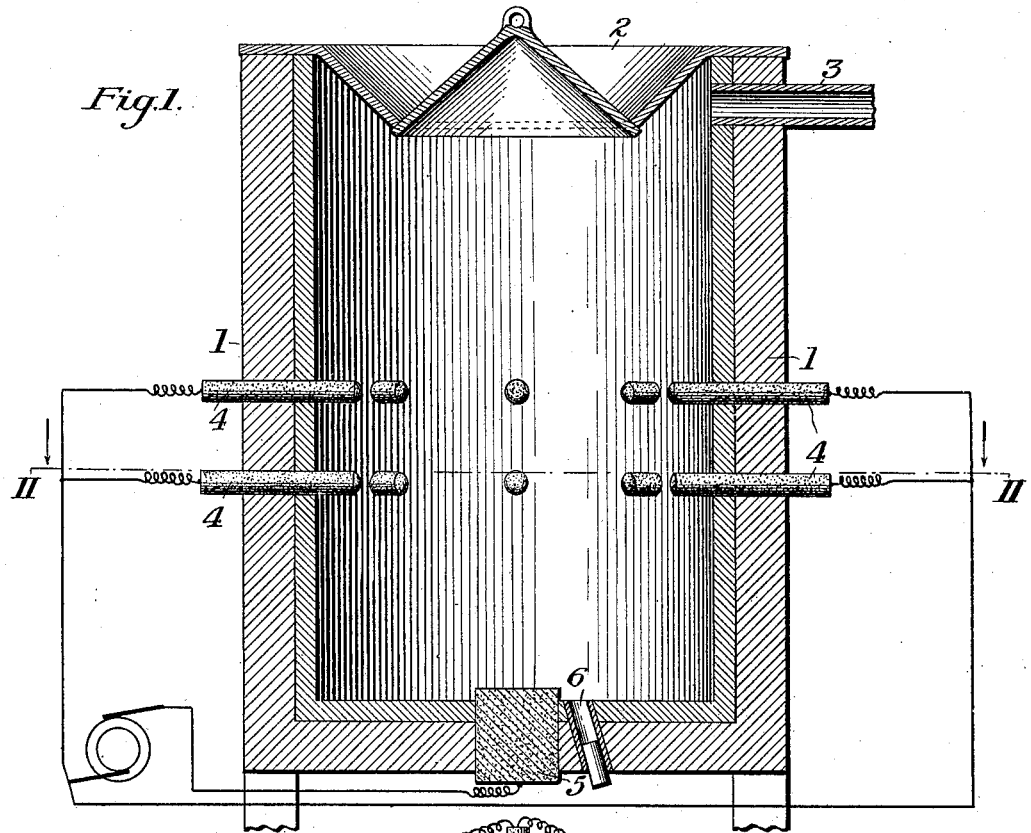
Figure 2:
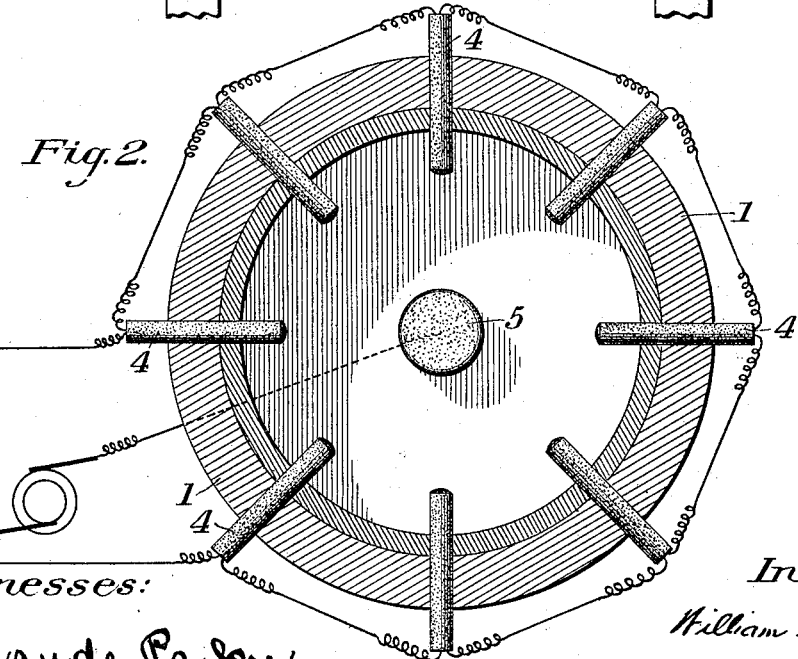

Figure 1 is a vertical axial section, and Fig. 2 is a horizontal section on line II II of Fig. 1.

The furnace chosen for illustration comprises an annular stack 1, of refractory material, such as fire-brick, having at its upper end a suitable mechanism 2 for introducing raw material and preventing the escape of gas, here shown as a bell and hopper. Through the side of the stack, near its upper end, passes a flue 3 for withdrawing the waste gases. Near the lower portion of the stack are arranged one or more horizontal series of radial electrodes 4, here shown as cylindrical rods, passing adjustably through the sides of the stack. Centrally through the base of the stack passes an electrode 5. The radial electrodes are connected to one terminal of a source of electric current—for example, a direct current or alternating-current dynamo—and the central electrode is connected to the other terminal. A tap-opening 6 for the molten carbid extends through the bottom of the furnace from a region of high temperature.

In carrying out the process to produce calcium carbid an initial charge consisting of lime and carbon is fed into a suitable furnace. In some instances and to provide for good conductivity I may employ the well-known charge containing large pieces of coke, which lie in contact with each other at various points, and thereby afford direct paths for the flow of current, the lime being distributed in the interstices between the pieces of coke. An electric current of sufficient amperage is passed through the charge and the portion where the current density is sufficient is brought to a temperature which causes the materials to react to form carbid and the carbid to be brought into a molten condition. The molten carbid is tapped out continuously or from time to time as it accumulates and fresh material fed into the furnace as required. The process is thus a continuous one. The waste gases passing up from the zone of reduction through the charge serve to preheat it, as well understood, and may be removed for heating or other purposes.

The lines of current-flow between the several outer electrodes to the central or inner electrode converge toward the latter, giving a gradually-increasing current density through the charge from the outer electrodes of the furnace to the central electrode. The corresponding heat generated by the passage of the current through the charge thus gradually increases inward to a region where a zone of reduction and fusion is maintained and where there is a minimum loss of heat by conduction and radiation. The charge is thus gradually preheated before reduction not only by the waste gases, but also by the heat engendered by the passage of the current through the mass. The central electrode is preferably arranged somewhat below the outer electrodes in order that the lines of current-flow may converge downwardly. The distance which the current passes through the charge between the outer electrodes and the central electrode and the consumption of current for preheating the charge may thus be adjusted by suitably varying the height of the outer electrodes above the central electrode. As the current-carrying capacity of each outer electrode is limited, the total energy expended in heating the charge depends to this extent on the number of such electrodes, which may be increased as desired either by arranging a greater number in the same horizontal series or by using any desired number of superposed horizontal series. By employing superposed outer electrodes it is evident that the current density in the lower part of the charge is increased by the additional current fed in through the lower of said electrodes.

It is not essential that the charge should consist of a mixture which is a conductor at atmospheric temperatures. The process may be equally employed for the production of calcium carbid from a mixture of ground coke and lime. In this case, however, it is necessary to either provide an initial conducting-path or arrange the radial electrodes nearly in the same horizontal plane as the top of the central electrode. The charge is thus preheated by conduction and radiation to a temperature which will enable it to act as a resistance-conductor when it descends into the paths of current-flow.

While the outer and central electrodes may all be in the same general horizontal plane, still the outer electrodes may be arranged sufficiently far above the central or inner electrode to bring the general path of the currents and the path of the feed into substantial coincidence. Furthermore, it may be remarked that the height at which the outer electrodes should be placed above the central electrode depends upon the nature of the charge which is to be treated and its conductivity. While in the furnace shown the outer electrodes are in horizontal position, nevertheless they can be inclined at any desired angle or otherwise arranged. While one central electrode is shown on the hearth, two or more lower electrodes may be employed or one may be employed arranged out of center, and in general the construction and arrangement of the apparatus may be widely varied, while it is still capable of use as a means for practicing the process claimed.

I claim—

1. The process of producing carbids, which consists in placing the terminals of a source of electric current in contact with different parts of a charge of carbid-forming materials, passing different quantities of electric current through different portions of said charge, and increasing the current density along the path of the current in the charge to a point where the heat generated by the resistance of the charge causes the materials to react to form carbid, as set forth.

2. The process of producing carbids, which consists in placing the terminals of a source of electric current in contact with different parts of a charge of carbid-forming materials, passing different quantities of electric current through different portions of said charge, and increasing the current density along the path of the current in the charge to a point where the heat generated by the resistance of the charge causes the materials to react to form carbid and the carbid to be brought into a molten condition, as set forth.

3. The process of producing carbids, which consists in placing the terminals of a source of electric current in contact with different parts of a charge of carbid-forming materials, passing different quantities of electric current through different portions of said charge, increasing the current density along the path of the current in the charge to a point where the heat generated by the resistance of the charge causes the materials to react to form carbid and the carbid to be brought into a molten condition, and tapping off said molten carbid and supplying fresh material as required, as set forth.

4. The process of producing calcium carbid, which consists in placing the terminals of a source of electric current in contact with different parts of a charge containing a calcium compound and carbon, passing different quantities of electric current through different portions of said charge, and increasing the current density along the path of the current in the charge to a point where the heat generated by the resistance of the charge causes the materials to react to form carbid, as set forth.

5. The process of producing calcium carbid, which consists in placing the terminals of a source of electric current in contact with different parts of a charge containing a calcium compound and carbon, passing different quantities of electric current through different portions of said charge, and increasing the current density along the path of the current in the charge to a point where the heat generated by the resistance of the charge causes the materials to react to form carbid and the carbid to be brought into a molten condition, as set forth.

6. The process of producing calcium carbid, which consists in placing the terminals of a source of electric current in contact with different parts of a charge containing a calcium compound and carbon, passing different quantities of electric current through different portions of said charge, increasing the current density along the path of the current in the charge to a point where the heat generated by the resistance of the charge causes the materials to react to form carbid and the carbid to be brought into a molten condition, and tapping off said molten carbid and supplying fresh materials as required, as set forth.

7. The process of producing carbids, which consists in placing the terminals of a source of electric current in contact with different parts of a charge of carbid-forming materials, and passing different quantities of electric current through different portions of said charge and causing the lines of current-flow to converge through the charge, thereby increasing the current density along the path of the current in the charge to a point where the heat generated by the resistance of the charge causes the materials to react to form carbid, as set forth.

8. The process of producing carbids, which consists in placing the terminals of a source of electric current in contact with different parts of a charge of carbid-forming materials, passing different quantities of electric current through different portions of said charge and causing the lines of current-flow to converge through the charge, thereby increasing the current density along the path of the current in the charge to a point where the heat generated by the resistance of the charge causes the materials to react to form carbid and the carbid to be brought into a molten condition, and tapping off said molten carbid and supplying fresh materials as required, as set forth.

9. The process of producing carbids, which consists in interposing a charge of carbid-forming materials as a resistance-conductor in an electric circuit, passing through different portions of said charge different quantities of electric current to cause the materials to react to form carbid and the carbid to be brought into a molten condition, removing the molten carbid and supplying fresh materials as required, and moving the charge substantially along the path of current-flow, as set forth.

10. The process of producing carbids, which consists in interposing a substantially vertical charge of carbid-forming materials as a resistance-conductor in an electric circuit, passing different quantities of electric current through different portions of said charge, and increasing the current density in a portion of said charge to a point where the heat generated by the resistance of the charge causes the materials to react to form carbid, as set forth.

11. The process of producing carbids, which consists in interposing a substantially vertical charge of carbid-forming materials as a resistance-conductor in an electric circuit, passing different quantities of electric current through different portions of said charge, and increasing the current density in a portion of said charge to a point where the heat generated by the resistance of the charge causes the materials to react to form carbid and the carbid to be brought into a molten condition, as set forth.

12. The process of producing carbids, which consists in interposing a substantially vertical charge of carbid-forming materials as a resistance-conductor in an electric circuit, passing different quantities of electric current through different portions of said charge, increasing the current density in a portion of said charge to a point where the heat generated by the resistance of the charge causes the materials to react to form carbid and the carbid to be brought into a molten condition, and tapping off said molten carbid and supplying fresh materials as required, as set forth.

13. The process of producing calcium carbid, which consists in interposing a substantially vertical charge containing a calcium compound and carbon as a resistance-conductor in an electric circuit, passing different quantities of electric current through different portions of said charge, and increasing the current density in a portion of said charge to a point where the heat generated by the resistance of said charge causes the materials to react to form carbid, as set forth.

14. The process of producing calcium carbid, which consists in interposing a substantially vertical charge containing a calcium compound and carbon as a resistance-conductor in an electric circuit, passing different quantities of electric current through different portions of said charge, and increasing the current density in a portion of said charge to a point where the heat generated by the resistance of said charge causes the materials to react to form carbid and the carbid to be brought into a molten condition, as set forth.

15. The process of producing calcium carbid, which consists in interposing a substantially vertical charge containing a calcium compound and carbon as a resistance-conductor in an electric circuit, passing different quantities of electric current through different portions of said charge, increasing the current density in a portion of said charge to a point where the heat generated by the resistance of said charge causes the materials to react to form carbid and the carbid to be brought into a molten condition, and tapping off said molten carbid and supplying fresh materials as required, as set forth.

16. The process of producing carbids, which consists in interposing a substantially vertical charge of carbid-forming materials as a resistance-conductor in an electric circuit, and passing through said conductor a plurality of electric currents superposed in such order that the current density increases through the conductor, thereby gradually heating the charge to a temperature sufficient to effect the production of carbid, as set forth.

17. The process of producing carbids, which consists in interposing a substantially vertical charge of carbid-forming materials as a resistance-conductor in an electric circuit, passing through said conductor a plurality of electric currents superposed in such order that the current density increases through the conductor, thereby gradually heating the charge to a temperature sufficient to effect the production of carbid and to bring the carbid into a molten condition, and tapping off the molten carbid and supplying fresh materials as required, as set forth.

In testimony whereof I have hereunto signed my name.

WILLIAM SMITH HORRY.

In presence of—
    F. B. O'CONNOR,
    D. WOODHOUSE.